United States Patent [19]
Kenney et al.

[11] Patent Number: 6,121,965
[45] Date of Patent: *Sep. 19, 2000

[54] USER INTERFACE FOR GRAPHICAL APPLICATION TOOL

[75] Inventors: David A. Kenney, N. Attleboro, Mass.; John Anthony Pantone, Birdsboro; Randall K. Wolf, Reading, both of Pa.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/953,497

[22] Filed: Oct. 17, 1997

[51] Int. Cl.⁷ ............................................. G06F 3/00
[52] U.S. Cl. ..................... 345/339; 345/348; 345/352; 345/353
[58] Field of Search ..................... 345/326, 333, 345/339, 348–350, 352–353, 357, 964

[56] References Cited

U.S. PATENT DOCUMENTS

| | | | |
|---|---|---|---|
| 4,823,283 | 4/1989 | Diehm et al. ............................ | 345/352 |
| 5,299,307 | 3/1994 | Young ...................................... | 345/339 |
| 5,367,626 | 11/1994 | Morioka et al. ......................... | 345/348 |
| 5,542,040 | 7/1996 | Chang et al. ............................ | 345/326 |
| 5,546,528 | 8/1996 | Johnston ................................. | 345/344 |
| 5,588,108 | 12/1996 | Kumar et al. ............................ | 345/348 |
| 5,625,783 | 4/1997 | Ezekiel et al. ........................... | 345/352 |
| 5,627,954 | 5/1997 | McFarland .............................. | 345/439 |
| 5,634,095 | 5/1997 | Wang et al. ............................. | 345/326 |
| 5,710,897 | 1/1998 | Schneider ............................... | 345/334 |

OTHER PUBLICATIONS

John Cooley, "Cadence: the Good, the Bad, & the Ugly," Integrated Systems Design magazine, downloaded from www.isdmag.com (1996).

Mark Flomenhoft, "At Long Last: EDA Tools That's Ready to Use," TechWeb News (Jan. 6, 1997).

Richard Goering, "EDA World on a Quest for Usability," TechWeb News (Oct. 9, 1995).

*Primary Examiner*—Raymond J. Bayerl
*Assistant Examiner*—X. L. Bautista

[57] ABSTRACT

A user interface for a graphical application tool is disclosed. A graphical application tool is a software program, such as a computer-aided design (CAD) tool, a spreadsheet package, or a graphics drawing package, that graphically provides a user with a set of commands, tools and icons, which a user can graphically manipulate to generate, modify or analyze a work product in a work space area. The graphical application tool includes a graphical user interface (GUI) to provide users with a repositionable menu of available commands, tools and icons. The menu provides access to the commands, tools and device offerings without interfering with the user's work space area. In the illustrative computer-aided design (CAD) tool embodiment, the menu preferably provides a user with access to core and custom commands and circuit component offerings. Core commands presented in a core command section of the menu are preferably context-determined so that commands appropriate to the current operating mode of the graphical application tool are presented. Circuit component offerings presented in the device offering section of the menu are preferably technology-determined so that device offerings appropriate to the specified technology are presented. In other words, when the graphical application tool is initiated, the user is preferably queried for the type of technology the user will be designing with.

24 Claims, 10 Drawing Sheets

USER INTERFACE FOR GRAPHICAL APPLICATION TOOL

FIELD OF THE INVENTION

The present invention relates to a user interface for graphical application programs, such as computer-aided design (CAD) tools, and more particularly, to a method and apparatus for allowing a user to access commands, tools and icons offerings more efficiently, while maximizing workspace area.

BACKGROUND OF THE INVENTION

As computer-aided design (CAD) tools and other graphical applications programs have become more complex, the technical expertise required to use them has increased dramatically. Typically, users access the various functions and features provided by a graphical applications program by means of a menu bar listing the names of pull-down menu options. When a pull-down menu option is selected for display from the menu bar, an additional set of commands are presented to the user in a window or dialog box for further selection. Thus, in order for a user to perform a given task, the user must typically traverse several levels of command menus and implement multiple mouse clicks to locate a desired command.

In addition, the additional windows or dialog boxes presented to a user for further selection, after selecting an initial pull-down menu option, tend to clutter the display, and the work space area in which the user is operating. The Composer™ computer-aided design (CAD) tool, commercially available from Cadence, Inc., for example, utilizes multiple floating windows to provide access to commands and device libraries. These floating windows cover the graphics area, forcing the user to repeatedly move the windows aside to view the schematic drawing hidden below. Furthermore, the use of multiple floating windows slows down the drafting process by increasing the time required to locate a desired command or circuit component icon, and increases the number of mouse clicks to perform a desired task.

In order to increase user-efficiency, some graphical application programs, such as the Design Architect™ computer-aided design (CAD) tool, commercially available from Mentor Graphics, Inc., provide users with an additional menu of the frequently used commands and circuit component icons. In this manner, the user may access these commands and icons more efficiently without using the menu bar system. The additional menu in the Design Architect™ product, however, is in a fixed location, taking away a portion of the workspace available to a user. In addition, the additional menu in the Design Architect™ product selectively presents a user with either commands or circuit component icons at a given time. The user must select a library to view the available command or circuit component icon options.

As apparent from the above-described deficiencies with conventional user interface systems for graphical application program, a need exists for a user interface that allows a user to access commands, tools and icons more efficiently, while maximizing work space area. A further need exists for a user interface that presents a user with available commands, tools and icons in a single menu. Yet another need exists for a user interface that is responsive to the current operating mode of the graphical application program and presents a user with appropriate selections depending on the current mode.

SUMMARY OF THE INVENTION

Generally, a user interface for a graphical application tool is disclosed. A graphical application tool is a software program, such as a computer-aided design (CAD) tool, a spreadsheet package, or a graphics drawing package, that graphically provides a user with a set of commands, tools and icons, which a user can graphically manipulate to generate, modify or analyze a work product in a work space area. The icons provided by the graphical application tool can include circuit components in a CAD system, clip art in a graphics drawing package or any other graphical representation or symbol to be placed in the work product. The graphical application tool includes a graphical user interface (GUI) to provide users with a menu of available commands, tools and icons.

According to a further aspect of the invention, the menu provides access to the commands, tools and device offerings without interfering with the user's work space area. In the illustrative computer-aided design (CAD) tool embodiment, the menu preferably provides a user with access to core and custom commands and circuit component offerings. The menu may be repositioned by a user, to minimize interference with the work space area. The menu preferably includes a region for indicating the particular technology, such as CMOS technology, with which the user is designing. In addition, the menu includes a set of tab notebooks for selecting various sets of core commands presented in a core command section. In addition, the menu preferably includes one or more custom command sections containing a user-defined subset of available custom commands. In this manner, the user has easy access to those commands used most often. Finally, the menu preferably includes a set of tab notebooks for selecting various sets of circuit component symbols presented in a device offering section. The circuit component symbols are placed in a drawing to represent an electrical component.

The core commands presented in the core command section are preferably context-determined so that commands appropriate to the current operating mode of the graphical application tool are presented. In other words, if the graphical application tool is performing a schematic operation, the presented core commands are preferably appropriate for the schematic level. Likewise, if the graphical application tool is performing a symbol operation, the presented core commands are preferably appropriate for the symbol level. For example, if a user is inserting a symbol into a drawing, the core commands presented in a text (T) tab notebook preferably include a command to add labels or properties to the inserted symbol.

The circuit component offerings presented in the device offering section are preferably technology-determined so that device offerings appropriate to the specified technology are presented. In other words, when the graphical application tool is initiated, the user is preferably queried for the type of technology the user will be designing with.

A more complete understanding of the present invention, as well as further features and advantages of the present invention, will be obtained by reference to the following detailed description and drawings.

DETAILED DESCRIPTION

Figure 1A:
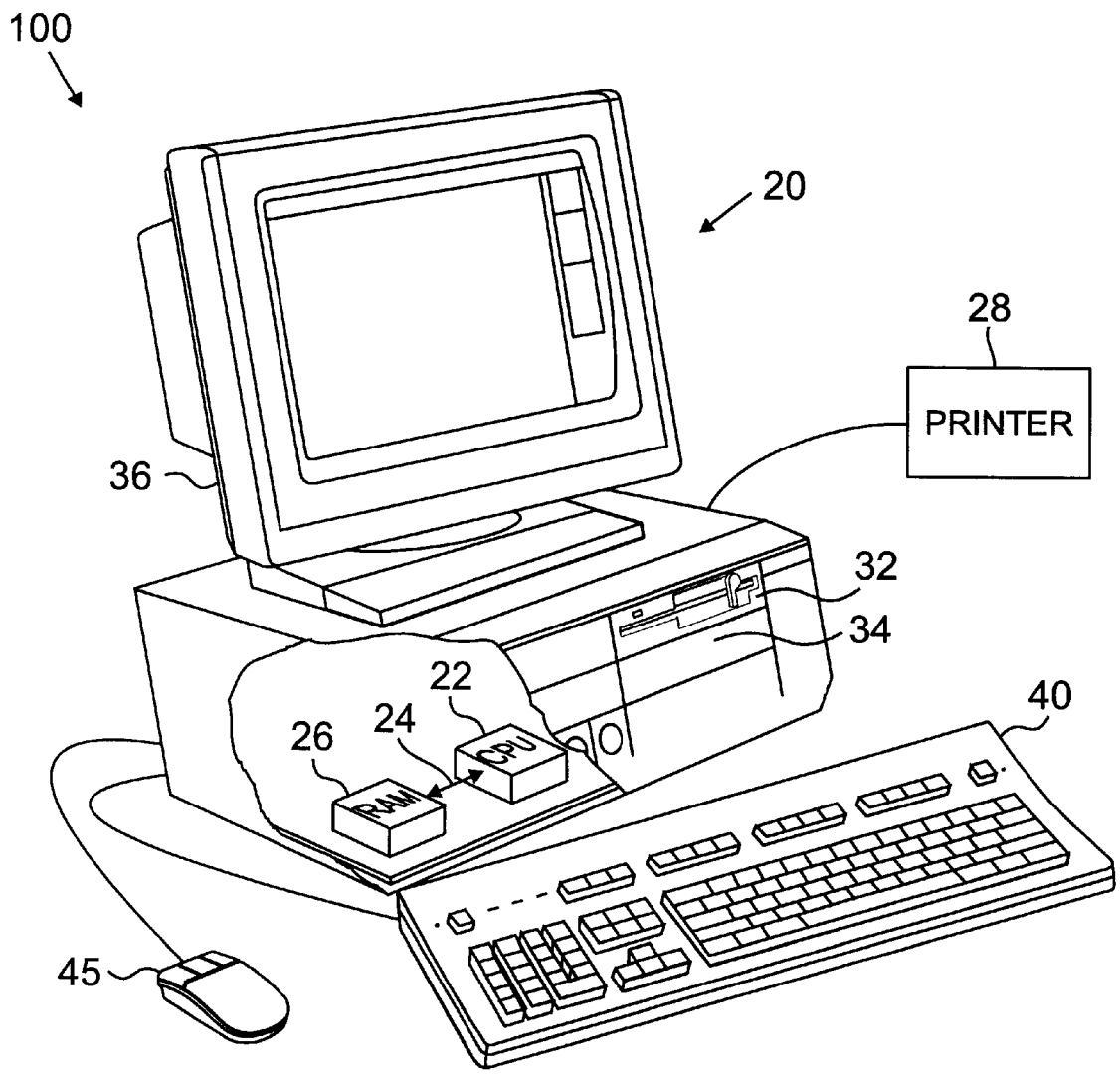
FIG. 1A is a perspective, cut-away view of a graphical application tool according to the present invention.
Figure 1B:
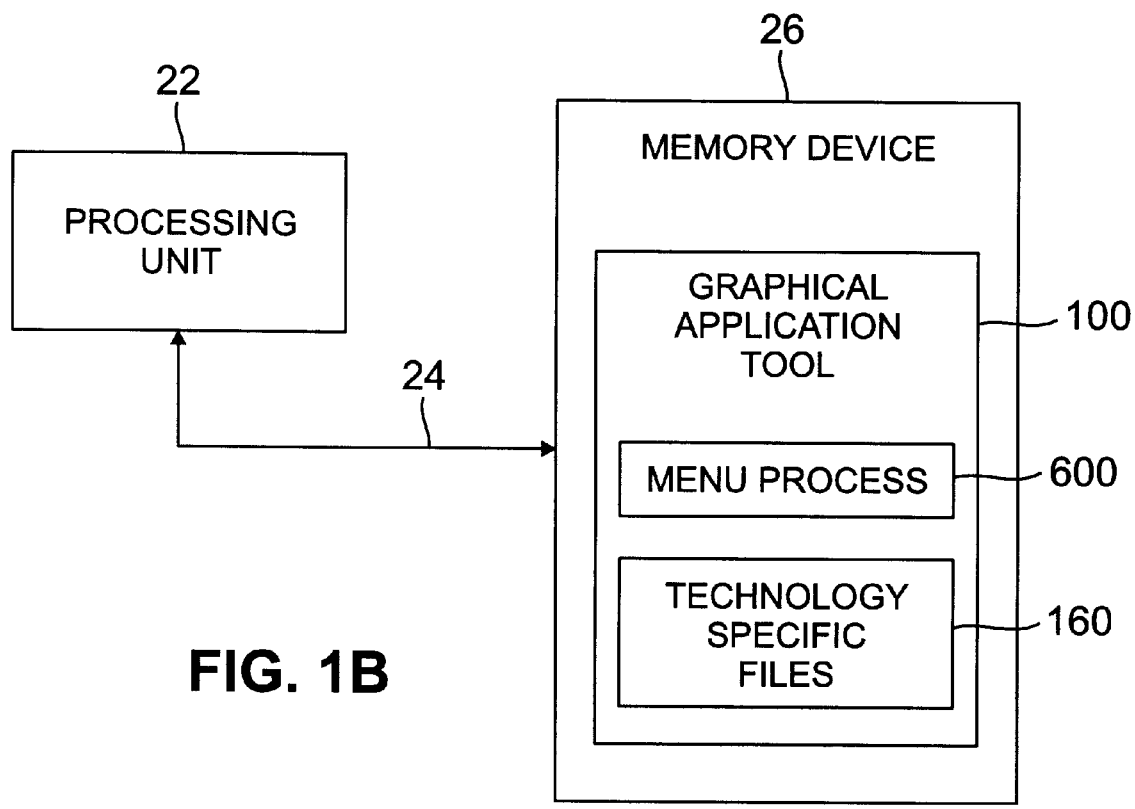
FIG. 1B is a functional block diagram illustrating the processing and memory storage systems of the graphical application program of FIG. 1A.
Figure 2:
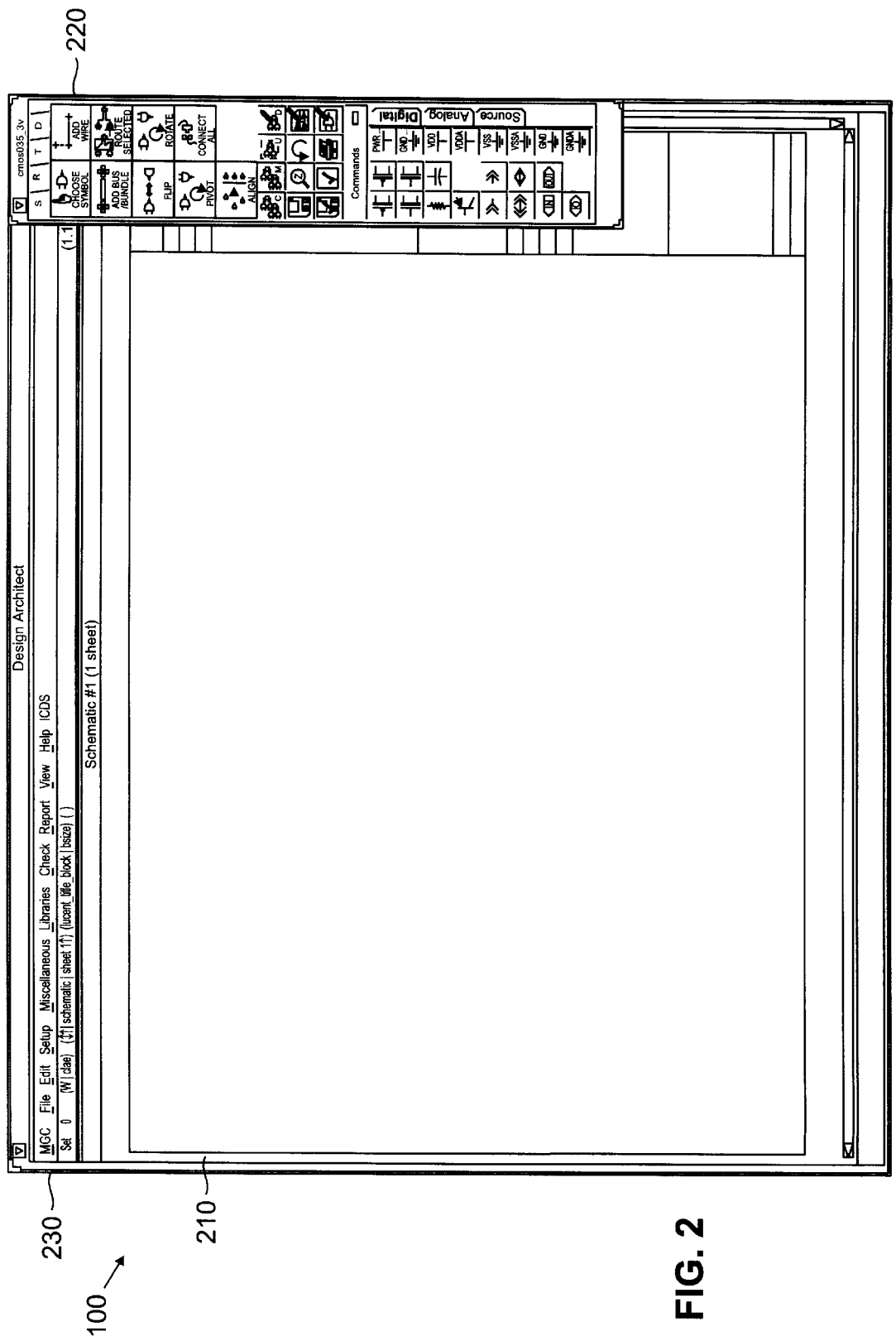
FIG. 2 illustrates a computer-aided design (CAD) tool monitor screen and its associated menu options.
Figure 3:
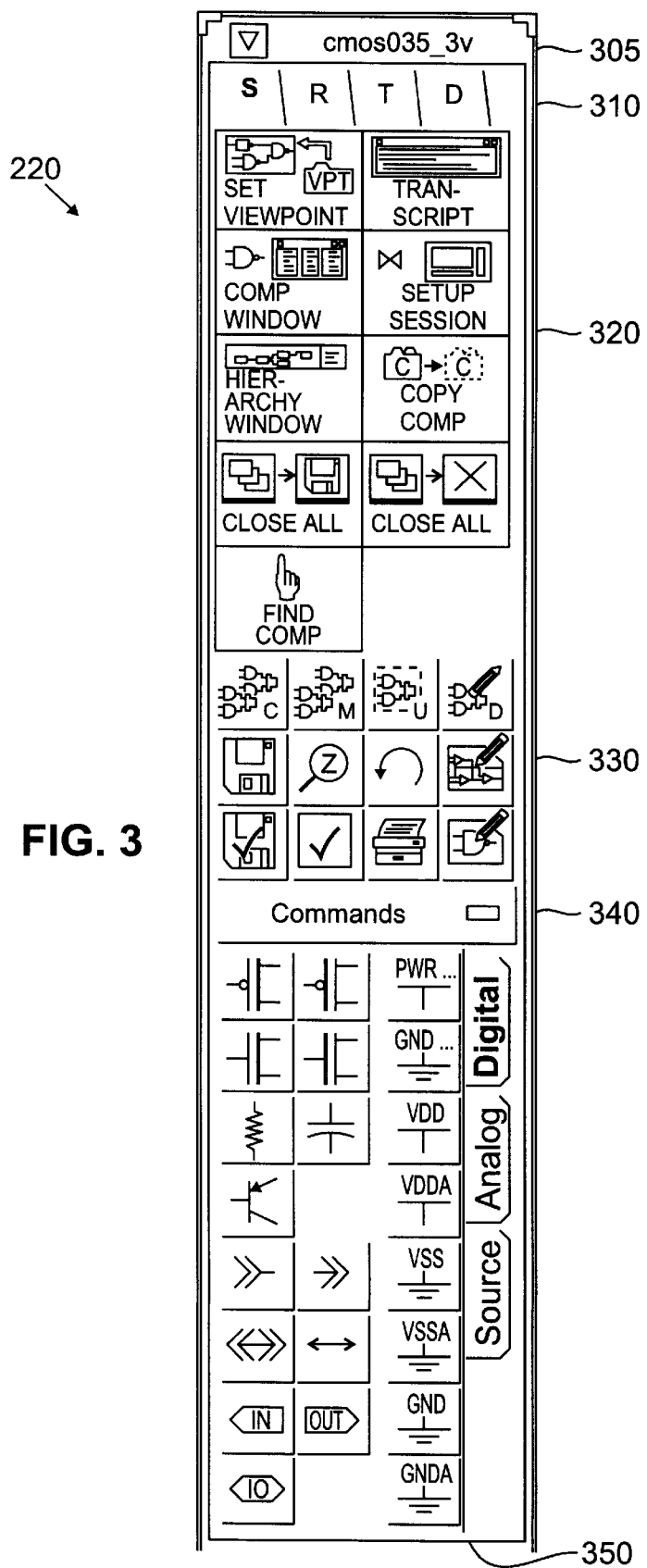
FIG. 3 illustrates the command and device menu of FIG. 2.

A graphical application tool 100 according to the present invention is shown in FIGS. 1 and 2. As used herein, a graphical application tool 100 is a software program, such as a computer-aided design (CAD) tool, a spreadsheet package, or a graphics drawing package, that graphically provides a user with a set of commands, tools and icons, which a user can graphically manipulate to generate, modify or analyze a work product in a work space area 210. In the illustrative implementation described herein, the graphical application tool 100 is embodied as the Design Architect™ computer-aided design (CAD) tool, commercially available from Mentor Graphics, Inc., as modified herein to carry out the features and functions of the present invention.

As discussed below, the icons provided by the graphical application tool 100 can include circuit components in a CAD system, clip art in a graphics drawing package or any other graphical representation or symbol to be placed in the work product. The graphical application tool 100 includes a graphical user interface (GUI) to provide users with a menu 220 (FIG. 2) of available commands, tools and icons. According to a feature of the present invention, the menu 220 provides access to the commands, tools and device offerings without interfering with the user's work space area 210.

The present invention may be implemented using a general purpose computing device, such as the computing device 20 shown in FIG. 1A, which may be embodied as a mainframe computer, a minicomputer, a workstation, a personal computer, or a networked combination of any of the foregoing. The computing device 20 preferably includes a graphical display monitor 36, one or more processing units 22, a memory storage device 26, such as random access memory, busses 24, a printer 28, and one or more user interfaces, such as a mouse 45 and a keyboard 40. The processing unit 22 and memory storage device 26 are discussed further below, in conjunction with FIG. 1B.

The computing system 20 preferably also includes an external disk drive 32 and a hard disk drive 34. The external disk drive 32 is operable to receive, read and write to one or more external data storage devices, such as a floppy disk, tape, or compact disk, while the hard disk drive 34 is operable to provide fast access data storage and retrieval functions, in a known manner. The mouse 45 or another graphical input device, together with the menu system described below in conjunction with FIGS. 2 through 5, provide a mechanism for user interaction with the computing system 20. The general purpose computing system 20 is running under a graphical user interface (GUI), such as Microsoft Windows, Presentation Manager or UNIX. The alphanumeric keyboard 40 provides the usual functions and additionally serves to enter data.

As shown in FIG. 1B, the processing unit 22, which may be embodied as a single processor or a number of processors operating in parallel, is preferably configured to implement the program code, discussed below in conjunction with FIGS. 6A and 6B, associated with the present invention which may be stored in the memory device 26. The memory device 26 preferably stores the program code for the graphical application tool 100, including a menu process 600 and one or more technology specific files 160, each discussed below in conjunction with FIG. 6.

FIG. 2 shows a menu bar 230 listing the names of typical pull-down menu options for a conventional computer-aided design (CAD) tool, such as the Design Architect™ computer-aided design (CAD) tool from Mentor Graphics, Inc. For a full description of these options, refer to the Design Architect™ User's Manual. When a pull-down menu option is selected for display from the menu bar 230, an additional set of menu choices are presented for further selection. Thus, in order for a user to perform a given task using the menu bar 230, the user must traverse several levels of command menus and implement multiple mouse clicks to locate a desired command.

According to a feature of the present invention, shown in FIG. 2, the graphical application tool 100 includes a menu 220 providing a user with access to core and custom commands and circuit component offerings. In a preferred embodiment, the menu 220 may be repositioned by a user, to minimize interference with the work space area 210. As shown in further detail in FIG. 3, the menu 220 preferably includes a region 305 for indicating the particular technology, such as CMOS technology, with which the user is designing. In addition, the menu 220 includes a set of tab notebooks 310 for selecting various sets of core commands presented in a core command section 320. As used herein, a core command is any software component provided by the manufacturer of the graphical application tool 100 to perform specified tasks. As discussed below in conjunction with FIGS. 4A through 4D, respectively, the menu 220 preferably includes a tab notebook for (i) session (S); (ii) route (R); (iii) text (T); and (iv) draw (D) core commands.

In addition, the menu 220 preferably includes one or more custom command sections 330, 340 containing a user-defined subset of available custom commands. Custom commands are preferably bound to icon buttons in section 330, as well as to pull down menu options in section 340. In this manner, the user has easy access to those commands used most often. Finally, the menu 220 preferably includes a set of tab notebooks 350 for selecting various sets of circuit component symbols presented in a device offering section 360. The circuit component symbols are placed in a drawing to represent an electrical component. As discussed below in conjunction with FIGS. 5A through 5C, the menu 220 preferably includes a tab notebook for (i) digital; (ii) analog; and (iii) source devices. Additional tab notebooks with further device collections could be provided as well.

In a preferred embodiment, the core commands presented in the core command section 320 are context-determined so that commands appropriate to the current operating mode of the graphical application tool 100 are presented. In other words, if the graphical application tool 100 is performing a schematic operation, the presented core commands are preferably appropriate for the schematic level. Likewise, if the graphical application tool 100 is performing a symbol operation, the presented core commands are preferably appropriate for the symbol level. For example, if a user is inserting a symbol into a drawing, the core commands presented in the text (T) tab notebook preferably include a command to add labels or properties to the inserted symbol.

Figure 4A:
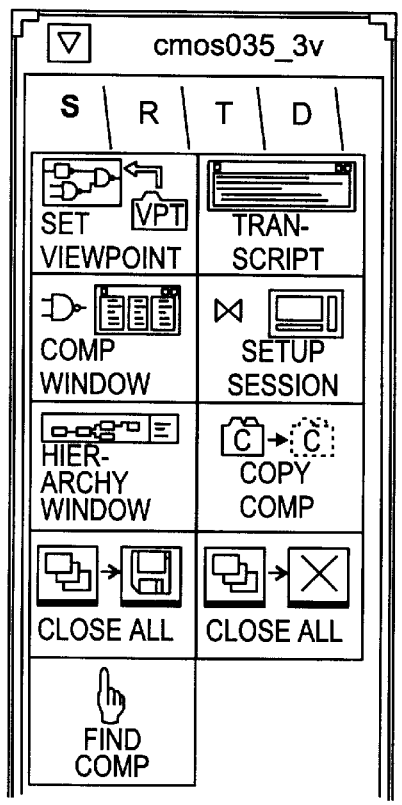
FIGS. 4A through 4D illustrate the various tab notebook sets of core commands from the command and device menu of FIG. 3.
Figure 4B:
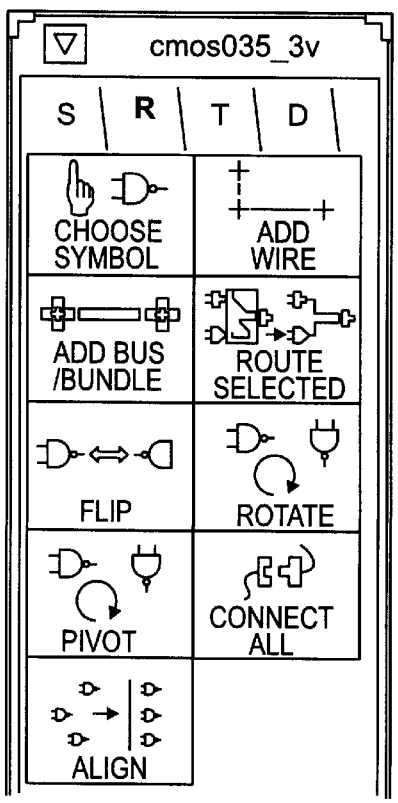
Figure 4C:
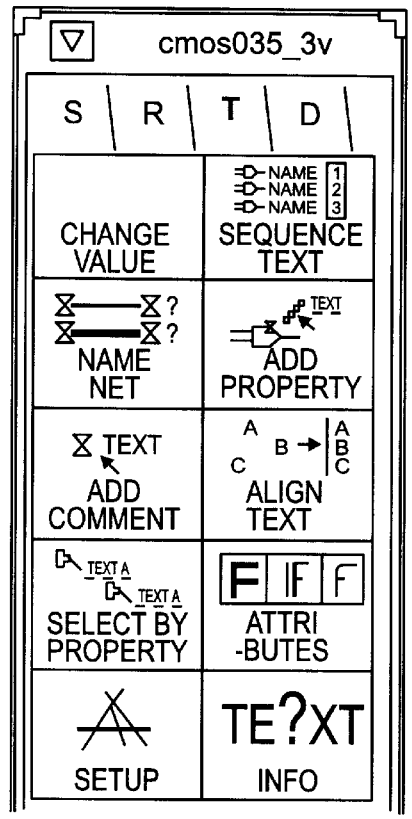
Figure 4D:
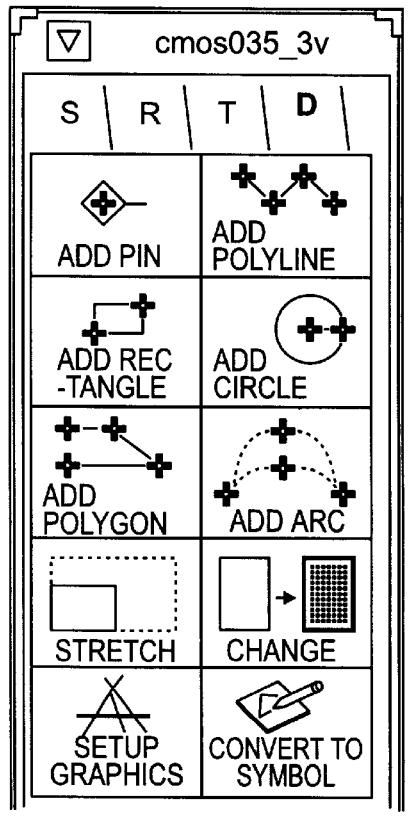

FIG. 4A illustrates the collection of core commands associated with the session (S) tab notebook. The session (S)

commands are not context-determined and apply globally to the computer-aided design (CAD) tool, such as file open and transcript (journal) commands. FIG. 4B illustrates the collection of core commands associated with the route (R) tab notebook. The route (R) commands allow a user to connect instantiated circuit symbols in a desired manner. FIG. 4C illustrates the collection of core commands associated with the text (T) tab notebook. The text (T) commands allow a user to manipulate labels and properties attached to symbols. FIG. 4D illustrates the collection of core commands associated with the draw (D) tab notebook. The draw (D) commands allow a user to add or manipulate graphical objects.

Figure 5A:
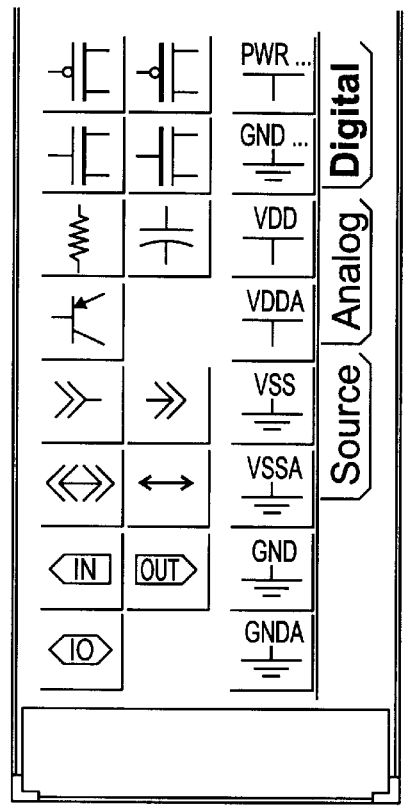
FIGS. 5A through 5C illustrate the various tab notebook sets of device offerings from the command and device menu of FIG. 3.
Figure 5B:
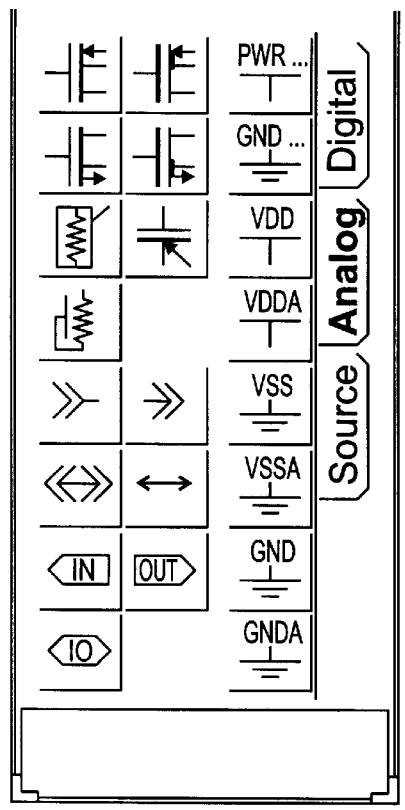
Figure 5C:
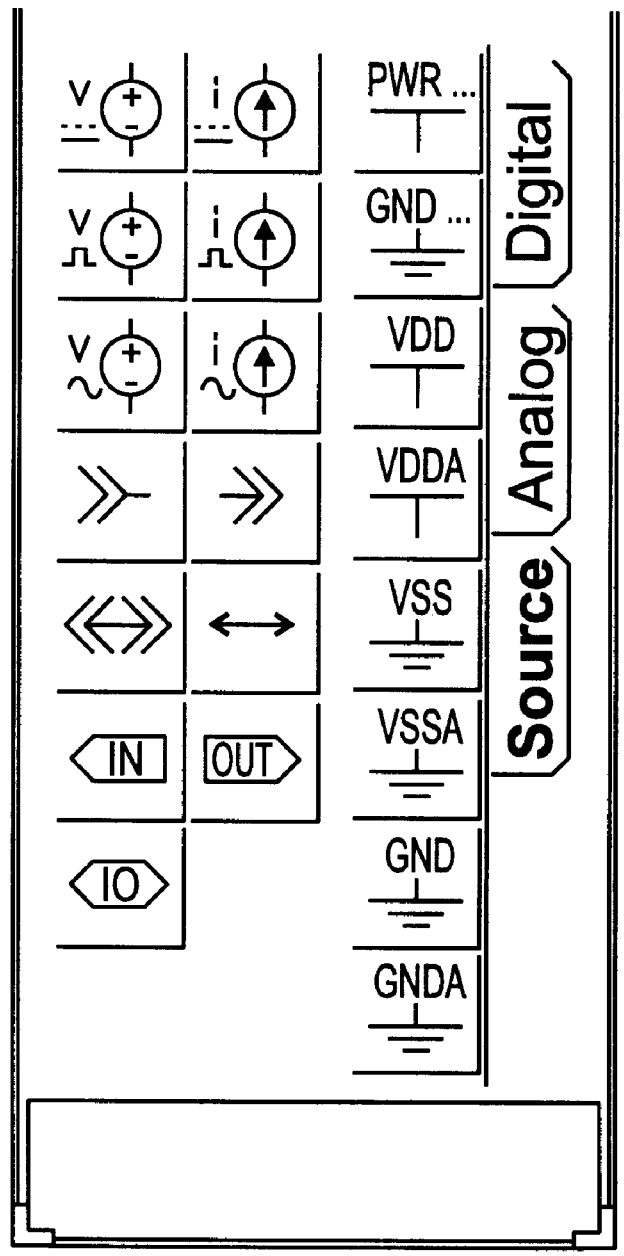

In a preferred embodiment, the circuit component offerings presented in the device offering section 360 are technology-determined so that device offerings appropriate to the specified technology are presented. In other words, when the graphical application tool 100 is initiated, the user is preferably queried for the type of technology the user will be designing with, as discussed further below in conjunction with FIG. 6A. FIGS. 5A through 5C illustrate the various device offerings for (i) digital; (ii) analog; and (iii) source devices, respectively, for CMOS technology.

Figure 6A:
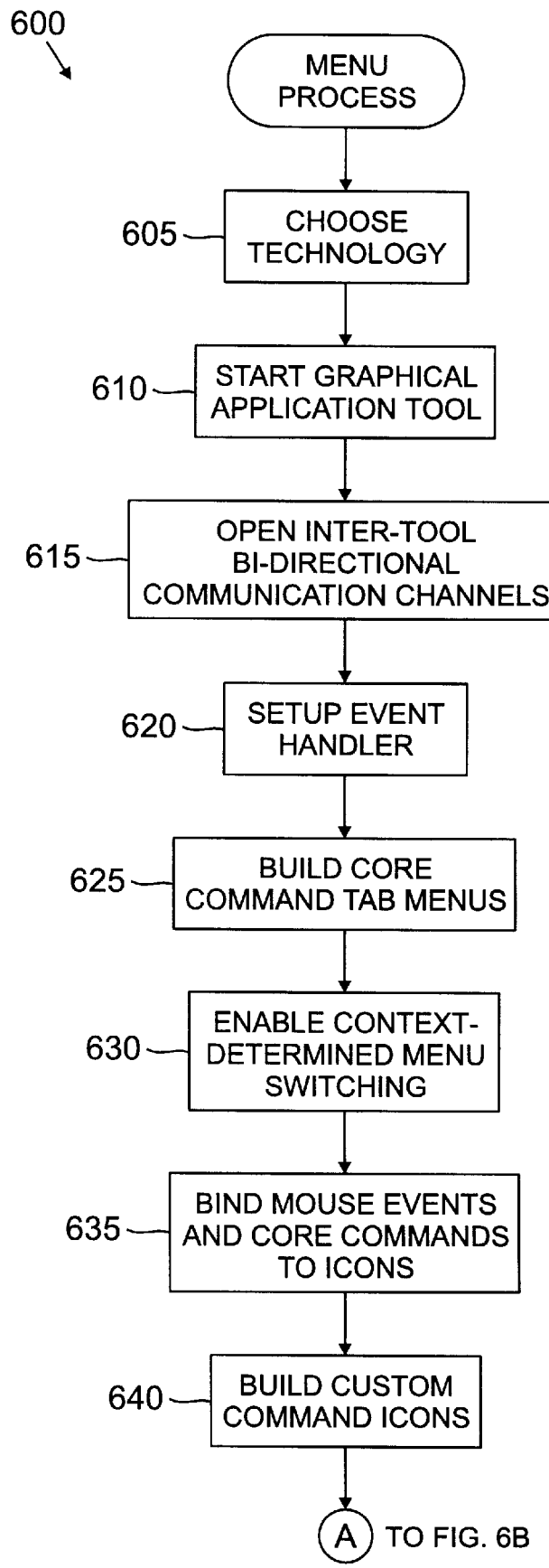
FIGS. 6A and 6B, collectively, are a flow chart describing an exemplary menu process implemented by the graphical application program of FIG. 1.
Figure 6B:
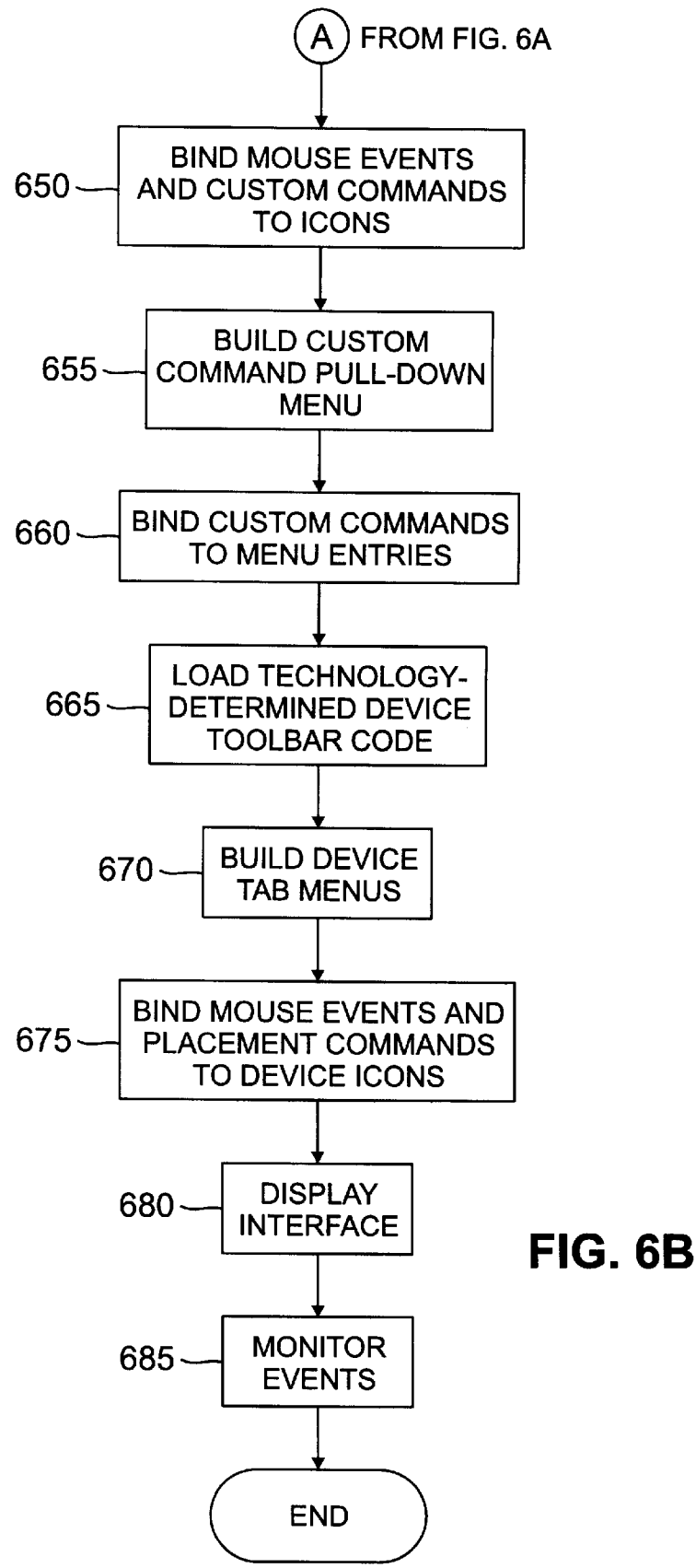

The menu process 600, shown in FIGS. 6A and 6B, monitors "mouse events" to initiate various software functions. For example, if a user clicks on a region of the menu 220, the menu process responds appropriately. As discussed further below, the icons or buttons associated with each tab notebook are programmed so that if the user clicks on the mouse in the region of a given tab, the core commands associated with the tab will come forward. Thus, tabs are associated with a set of icons that are bound to an appropriate software function. In a preferred embodiment, multiple events may be bound to a single icon. For example, if a user clicks on an icon once with the mouse 45, one action will occur, and a different action is initiated upon a double click. For example, both "undo" and "redo" or "zoom in" and "zoom out" can be bound to the same icon, and separately initiated depending on the number of mouse clicks. In an alternate implementation, separate actions can be initiated by each of the various buttons on the mouse 45. In addition, if the mouse pointer remains idle over a region of the menu 220 for a predefined minimum period of time, the menu process 600 preferably initiates a help function and presents a balloon message indicating the command, tool or symbol bound to a given icon.

As shown in FIG. 6A, the menu process 600 initially queries the user to specify the technology the user will be working with during step 605 and thereby define an environment variable. Thereafter, the graphical application tool 100 will be launched during step 610, and inter-tool bidirectional communication channels or pipes are opened during step 615 for communication between the menu process 600 and other processes associated with the graphical application tool 100. An event handler is setup during step 620 to monitor for mouse events and other user events and to respond appropriately.

Thereafter, the menu process 600 builds the menu 200, preferably from top to bottom. Thus, the core command tab menus 310, 320 are preferably built during step 625. The context-determined menu switching, discussed above, is enabled during step 630 by monitoring and responding to the event handler. The mouse events and core command functions are then bound to the appropriate icons during step 635 in sections 310 and 320 of the menu 220. The custom command icons 330 are built during step 640 and the mouse events and custom commands are then bound to the appropriate icons during step 650. The custom command pull-down menu 340 is built during step 655, and the appropriate custom commands are bound to the menu entries during step 660.

The technology-specific device toolbar code is then loaded from the technology specific files 160 (FIG. 1B) during step 665, by reading the user-defined technology environment variable and reading the appropriate file from a predefined library path. The device offering tab menus 350, 360 are then built during step 670 and the mouse events and placement commands are then bound to each device icon during step 675. Finally, the menu 220 or interface created by the menu process 600 is displayed during step 680, before the menu process 600 commences monitoring events during step 685.

It is to be understood that the embodiments and variations shown and described herein are merely illustrative of the principles of this invention and that various modifications may be implemented by those skilled in the art without departing from the scope and spirit of the invention. For example, although the graphical application tool 100 has been illustrated herein as the Design Architect™ computer-aided design (CAD) tool, from Mentor Graphics, Inc., the graphical application tool 100 may be embodied as any computer-aided design (CAD) tool, spreadsheet package, or graphics drawing package, that graphically provides a user with a set of commands, tools and icons, which a user can graphically manipulate to generate, modify or analyze a work product in a work space area 210.

We claim:

1. A method of providing access to commands and symbolic icons in a graphical application program having a work space area, said method comprising the step of:

organizing said commands and symbolic icons into a plurality of categories;

generating a menu of said command and symbolic icon options, said menu containing a section for one or more of said command categories and a section for one or more of said symbolic icon categories;

positioning said menu in a screen location that does not interfere with said work space area; and providing a user with said command and symbolic icon sections simultaneously on said menu.

2. The method according to claim 1, further comprising the step of separately presenting core commands and custom commands on said menu.

3. The method according to claim 1, wherein a plurality of said command categories are each separately accessible by a tab icon.

4. The method according to claim 1, further comprising the step of separately presenting said commands in said menu dependent upon an operating mode of said graphical application program.

5. The method according to claim 1, wherein a plurality of said symbolic icon categories are each separately accessible by a tab icon.

6. The method according to claim 1, wherein said symbolic icons are specific to a technology being manipulated in said work space area.

7. The method according to claim 1, further comprising the step of binding multiple events to a single icon.

8. A graphical application tool comprising:

a set of command and symbolic icon options for generating a work product in a work space area, said commands and symbolic icons being organized into a plurality of categories;

a graphical menu containing at least two sections for separately presenting one or more of said categories of command options and one or more of said symbolic icon options to a user, said graphical menu positioned in a screen location that does not interfere with said work space area; and a processor for providing said user with said command and symbolic icon sections simultaneously on said graphical menu.

9. The tool according to claim 8, wherein said commands include core commands and custom commands which are separately presented on said menu.

10. The tool according to claim 8, wherein a plurality of said command categories are each separately accessible by a tab icon.

11. The tool according to claim 8, wherein said commands viewable in said menu are dependent upon an operating mode of said graphical application program.

12. The tool according to claim 8, wherein a plurality of said symbolic icon categories are each separately accessible by a tab icon.

13. The tool according to claim 8, wherein said symbolic icons are specific to a technology being manipulated in said work space area.

14. The tool according to claim 8, wherein multiple events may be bound to a single icon.

15. An article of manufacture comprising:

a computer readable medium having computer readable code embodied thereon, said computer readable program code comprising:

a step to organize said commands and symbolic icons into a plurality of categories;

a step to generate a menu of command and symbolic icon options for generating a work product in a work space area, said menu containing a section for one or more of said command categories and a section for one or more of said symbolic icon categories;

a step to position said menu in a screen location that does not interfere with said work space area; and a step to provide a user with said command and symbolic icon sections simultaneously on said menu.

16. The article of manufacture according to claim 15, wherein said article of manufacture is a CD-ROM.

17. The article of manufacture according to claim 15, wherein said article of manufacture is a diskette.

18. The article of manufacture according to claim 15, further comprising a step to organize said symbolic icons into a plurality of categories, each separately accessible by a tab icon.

19. The article of manufacture according to claim 15, further comprising a step to bind multiple events to a single icon.

20. The article of manufacture according to claim 15, further comprising a step to separately present said commands in said menu dependent upon an operating mode of said graphical application program.

21. A method of providing access to commands and symbolic icons in a graphical application program having a work space area, said method comprising the step of:

assigning said command and symbolic icon options to at least two categories, each of said categories having a plurality of icon options;

generating a menu containing a section for said command category and a section for said symbolic icon category; and providing at least a portion of said command and symbolic icon categories simultaneously on said menu.

22. The method according to claim 21, wherein each of said categories are separately accessible by a tab icon.

23. The method according to claim 21, further comprising the step of separately presenting said commands in said menu dependent upon an operating mode of said graphical application program.

24. The method according to claim 21, wherein said symbolic icons are specific to a technology being manipulated in said work space area.

* * * * *